United States Patent
Mouly et al.

(10) Patent No.: US 12,509,996 B2
(45) Date of Patent: Dec. 30, 2025

(54) ASSEMBLY FOR A TURBOMACHINE COMPRISING LUBRICANT EVACUATION MEANS, AND TURBOMACHINE EQUIPPED WITH SUCH AN ASSEMBLY

(71) Applicant: SAFRAN TRANSMISSION SYSTEMS, Colombes (FR)

(72) Inventors: Guillaume Pierre Mouly, Moissy-Cramayel (FR); Guillaume Julien Beck, Moissy-Cramayel (FR); Boris Pierre Marcel Morelli, Moissy-Cramayel (FR); Antoine Jacques Marie Pennacino, Moissy-Cramayel (FR); Jean-Pierre Serey, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 18/420,229

(22) Filed: Jan. 23, 2024

(65) Prior Publication Data

US 2024/0254892 A1 Aug. 1, 2024

(51) Int. Cl.
*F01D 25/18* (2006.01)
*F01D 15/12* (2006.01)

(52) U.S. Cl.
CPC .............. *F01D 15/12* (2013.01); *F01D 25/18* (2013.01); *F05D 2260/40311* (2013.01); *F05D 2260/98* (2013.01)

(58) Field of Classification Search
CPC ... F01D 25/18; F01D 5/12; F05D 2260/40311
See application file for complete search history.

(56) References Cited

U.S. PATENT DOCUMENTS 11,008,942 B2 * 5/2021 Jacquemard .............. F02C 7/06
12,044,305 B2 * 7/2024 Jacquemard ............ F01D 25/18
(Continued)

FOREIGN PATENT DOCUMENTS

EP 3473893 A1 4/2019
EP 3575562 A1 12/2019
(Continued)

OTHER PUBLICATIONS

FR2300847, French Novelty Search Report, Sep. 19, 2023, 2 pages.

*Primary Examiner* — Sabbir Hasan
(74) *Attorney, Agent, or Firm* — Kilpatrick Townsend & Stockton LLP

(57) ABSTRACT

The invention relates to a turbomachine assembly (1) extending around a longitudinal axis and comprising a speed reduction gear (16) having an external ring gear (23) and a gutter (41) for recovering a lubricant ejected by centrifugal effect, the gutter (41) being arranged around the external ring gear and comprising an area (43) for collecting the lubricant received by ejection.

According to the invention, the gutter (41) is secured in terms of rotation to the external ring gear and in that the assembly comprises a device (50) for evacuating the lubricant to the outside of the collection area (43), the evacuation device being intended to be connected to a stator of the turbomachine and extending at least partly into the collection area, the evacuation device being configured so as to evacuate the lubricant located in the collection area to an oil evacuation area located outside the gutter.

15 Claims, 6 Drawing Sheets

(56) References Cited

U.S. PATENT DOCUMENTS

2019/0226575 A1    7/2019   Kurz-Hardjosoekatmo et al.
2020/0032710 A1    1/2020   Jacquemard et al.

FOREIGN PATENT DOCUMENTS

FR         3084427 A1    1/2020
WO    2020245529 A1   12/2020

* cited by examiner

ASSEMBLY FOR A TURBOMACHINE COMPRISING LUBRICANT EVACUATION MEANS, AND TURBOMACHINE EQUIPPED WITH SUCH AN ASSEMBLY

FIELD OF THE INVENTION

The present invention relates to the general field of aeronautic. In particular, it is designed to lubricate rotating members such as a speed reduction gear and to recover the lubricant ejected by the rotating members by centrifugal effect.

TECHNICAL BACKGROUND

The prior art comprises the documents WO-A1-2020/245529, US-A1-2020/032710, EP-A1-3473893, US-A1-2019/226575.

The role of a mechanical reduction gear is to modify the speed and torque ratio between the input axle and the output axle of a mechanical system.

The new generations of double flow turbomachines, in particular those with a high bypass ratio, comprise a mechanical reduction gear to drive the shaft of a fan. The usual purpose of the reduction gear is to convert the rotational speed referred to as high speed of the shaft of a power turbine into a slower rotational speed for the shaft driving the fan.

Such a reduction gear comprises a central pinion, referred to as sun gear, a ring gear and pinions referred to as planet gears, which are engaged between the sun gear and the ring gear. The planet gears are held by a chassis referred to as planet carrier. The sun gear, the ring gear and the planet carrier are planetary because their axes of revolution coincide with the longitudinal axis X of the turbomachine. The planet gears each have a different axis of revolution and are equally distributed on the same operating diameter around the axis of the planetary. These axes are parallel to the longitudinal axis X.

There are several reduction gear architectures. In the prior art of the dual-flow turbomachines, the reduction gears are of the planetary or epicyclic type. In other similar applications, there are architectures referred to as differential or "compound".

In a planetary reduction gear, the planet carrier is stationary and the ring gear is the output shaft of the device which rotates in the opposite orientation of the sun gear.

In an epicyclic reduction gear, the ring gear is stationary and the planet carrier is the output shaft of the device which rotates in the same orientation as the sun gear.

On a compound reduction gear, no element is attached in rotation. The ring gear rotates in the opposite orientation of the sun gear and of the planet carrier.

The reduction gears can consist of one or more meshing stages. This meshing is ensured in different ways such as by contact, friction or magnetic field.

There are several types of contact meshing such as straight, helical or herringbone toothings.

The solution proposed below is compatible
with a single or multi-stage reduction gear;
with a planetary or differential reduction gear;
with herringbone toothings.

A speed reduction gear requires several thousand litres of lubrication per hour in all circumstances so that the turbomachine operates correctly and is efficient. If the speed reduction gear is not sufficiently lubricated, friction between the teeth of the meshing pinions or at the level of the bearings leads to premature wear and a reduction in the efficiency of the speed reduction gear. These bearings, wheels and/or meshing pinions of a speed reduction gear can generate a high thermal power which must be evacuated by the lubricant to prevent damage to the speed reduction gear.

The lubricant must also be evacuated from the speed reduction gear as quickly as possible so as, on the one hand to maximise its performance and on the other hand to limit the volume of the reservoir and therefore the overall dimension and the onboard mass of the lubrication system. This also helps to improve the performance of the turbomachine as a whole.

To achieve this, a recovering gutter is placed around the ring gear of the speed reduction gear to recover the lubricant ejected by centrifugal force. An example of a speed reduction gear with a recovering gutter is described in the document EP-A1-3575562.

However, the gutter is usually attached to the stator of the turbomachine when the ring gear is movable in rotation and may overflow so that the recovery of the lubricant is not complete or efficient. This problem could have an impact on the weight of the turbomachine, as a larger gutter would be required to accommodate a greater quantity of lubricant. In addition, the lubricant must circulate easily around the internal circumference of the gutter without obstacles to control its recovery, which can be carried out at a low point (at 6 o'clock) and/or at a high point (12 o'clock) on the turbomachine. If the lubricant is slowed down on the recovery path this creates an accumulation and then spills anywhere in the enclosure where the recovery seems less effective.

SUMMARY OF THE INVENTION

The aim of the present invention is to provide a solution that avoids the risk of overflow during the evacuation of the lubricant, while at the same time avoiding a considerable impact on the mass of the assembly comprising a speed reduction gear.

This is achieved in accordance with the invention by a turbomachine assembly extending about a longitudinal axis and comprising:
  a speed reduction gear comprising a sun gear pinion, planet gears pinions and an external ring gear, the planet gear pinions being in mesh with the sun gear pinion on the one hand and with the external ring gear on the other,
  a recovering gutter for recovering a lubricant ejected by centrifugal effect from the speed reduction gear during operation, the gutter being arranged around the external ring gear and comprising an area for collecting the lubricant received by ejection,
  the gutter being secured in rotation to the external ring gear and the assembly comprising a device for evacuating the lubricant towards the outside of the collection area, the evacuation device being intended to be connected to a stator of the turbomachine and extending at least partly into the collection area of the gutter, the evacuation device being configured so as to evacuate the lubricant located in the collection area towards an oil evacuation area located outside the gutter.

Thus, this solution allows to achieve the above-mentioned objective. In particular, with such a configuration, the lubricant can be evacuated at a given point without the risk of creating an overflow. The arrangement of the evacuation device means that the driving force of the lubricant, which is constantly rotating in the gutter, is maintained. The evacuation is also carried out at a specific point in the gutter. This is a simple and cost-effective solution. This solution does not require any substantial modifications to the turbomachine.

The turbomachine assembly also comprises one or more of the following characteristics, taken alone or in combination:

- the external ring gear can be movable in rotation about the longitudinal axis.
- each planet gear pinion comprises the same toothing meshing with the sun gear pinion and the external ring gear.
- each planet gear pinion comprises a first toothing with a first mean diameter meshing with the sun gear pinion, and a second toothing with a second mean diameter, different from the first mean diameter, meshing with the external ring gear.
- the external ring gear comprises a radial attachment flange to which a radial leg of the gutter is attached, the radial attachment flange comprising means for ejecting lubricant outside the speed reduction gear.
- the external ring gear is formed by two half-ring gears comprising a first half-flange and a second half-flange respectively, the first half-flange and the second half-flange forming the radial attachment flange and being attached together by attachment members.
- the collection area of the gutter is axially offset from the radial attachment flange relative to a median plane P of the external ring gear perpendicular to the longitudinal axis X.
- the collection area of the gutter is delimited by a retention wall having a U-shaped, C-shaped or semi-circular axial cross-section, the retention wall being connected to the radial leg via a guide wall which is inclined with respect to the longitudinal axis X.
- the guide wall of the gutter has an inflection point at the junction with the retention wall.
- the collection area of the gutter is opposite the radial attachment flange.
- the evacuation device comprises a first end arranged in the collection area and a second end arranged outside the collection area.
- the evacuation device comprises at least one pipe comprising a plurality of segments extending in different directions from one another, the pipe comprising an inlet which opens into the collection area of the gutter so as to evacuate the lubricant located in the collection area towards a lubricant evacuation area located outside the gutter.
- the evacuation device comprises at least one deflector, a first segment of which is arranged in the collection area of the gutter, the first segment having a deflecting surface configured so as to evacuate the lubricant located in the collection area towards a lubricant evacuation area located outside the gutter.
- the evacuation device comprises an end arranged in the collection area and which is bevelled so as to evacuate the lubricant located in the collection area towards a lubricant evacuation area located outside the gutter.
- each planet gear pinion comprising a cylindrical body and an annular web extending substantially radially outwards from the middle of this cylindrical body, the teeth of the second toothing being located at the axial ends of the body, and the teeth of the first toothing being located at the external periphery of the web.
- the evacuation device comprises at least one inflection point.
- the collection area comprises at least one inflection point.
- the gutter wall comprises at least one inflection point.
- the ejection means open onto the external periphery of the radial attachment flange.
- the speed reduction gear has a planetary gear train or is a differential speed reduction gear with an epicyclic gear train.
- the planet gears are single- or double-stage.

The invention also concerns a turbomachine comprising such an assembly.

The invention further relates to an aircraft comprising a turbomachine as mentioned above.

BRIEF DESCRIPTION OF THE FIGURES

The invention will be better understood, and other purposes, details, characteristics and advantages thereof will become clearer upon reading the following detailed explanatory description of embodiments of the invention given as purely illustrative and non-limiting examples, with reference to the appended schematic drawings in which.

DETAILED DESCRIPTION OF THE INVENTION

Figure 1:
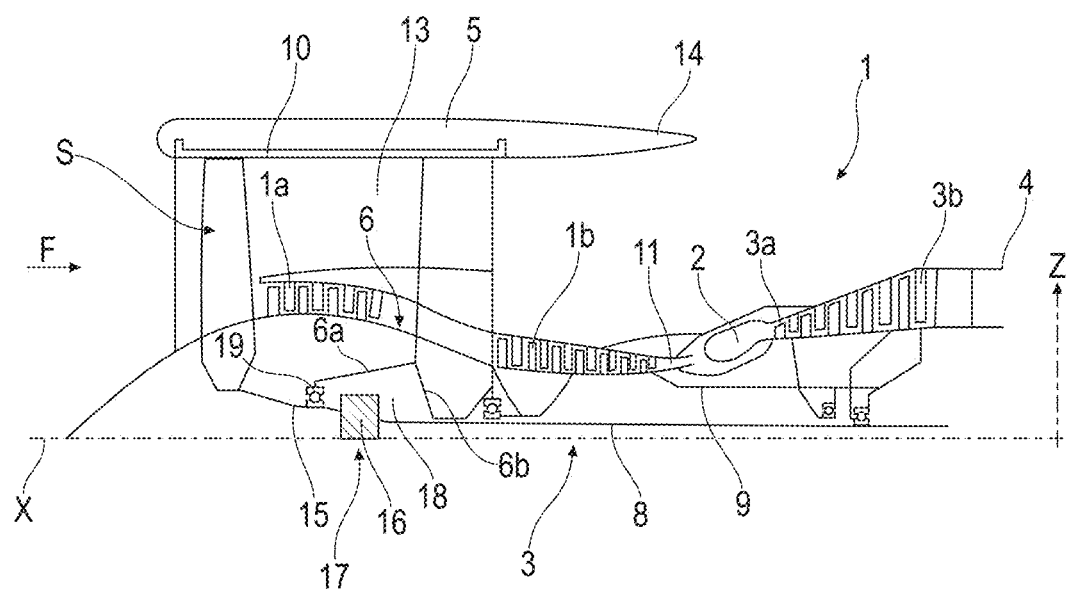
FIG. 1 is an axial cross-sectional view of an example of a turbomachine to which the invention applies.

FIG. 1 shows an axial cross-section of a turbomachine 1 of longitudinal axis X comprising a power transmission system and to which the invention applies.

In the present invention, the terms "upstream" and "downstream" are defined in relation to the circulation of the gases in the turbomachine and here along the longitudinal axis X and with reference to FIG. 1 from left to right. Similarly, a turbomachine is usually made up of several modules that are manufactured independently of each other and then assembled together in a way that facilitates its assembling, dismounting and its maintenance.

The turbomachine 1 typically comprises a fan S, a low-pressure compressor 1a, a high-pressure compressor 1b, an annular combustion chamber 2, a high-pressure turbine 3a, a low-pressure turbine 3b and an exhaust nozzle 4. The high-pressure compressor 1b and the high-pressure turbine 3a are connected by a high-pressure shaft 9 and together form a high-pressure (HP) body. The low-pressure compressor 1*a* and low-pressure turbine 3*b* are connected by a low-pressure shaft 8 and together form a low-pressure (LP) body.

The fan S is ducted in a fan casing 10 supported by an external nacelle 5. The fan S generates, from an air flow F entering the fan, a primary air flow which circulates in a primary duct 11 opening into the exhaust nozzle 4 and a secondary air flow which circulates in a secondary duct 13, around the primary duct 11, opening into an ejection nozzle 14.

The fan S is driven in rotation by a fan shaft 15, which in turn is driven in rotation by the low-pressure shaft 8 via a speed reduction gear 16. The power transmission system comprises the speed reduction gear 16. The latter is generally of the planetary or epicyclic type.

Although the following description relates specifically to a planetary-type reduction gear, it can also be applied to an epicyclic-type reduction gear or to a mechanical differential in which the three components, namely the planet carrier 22, the external ring gear 23 and the sun gear pinion 20, are movable in rotation, the speed of rotation of one of these components depending in particular on the difference in speeds of the other two components.

The reduction gear 16 (or RGB) is positioned in the upstream portion of the turbomachine in this example. Of course, the reduction gear 16 could be arranged downstream of the turbomachine.

A stationary structure comprising schematically, here, an upstream portion 6*a* and a downstream portion 6*b* which makes up the motor casing or stator 6 is arranged so as to form an enclosure 18 surrounding the reduction gear 16. A lubricant mist prevails in the enclosure 18. This enclosure 18 is closed upstream by seals at the level of an upstream bearing 19 allowing the fan shaft 15 to pass through, and downstream by seals at the level of the low-pressure shaft 8.

The turbomachine 1 described is a double flow turbomachine 1 designed to be mounted on an aircraft. Of course, the invention can be applied to other types of turbomachines, such as turboprop engines equipped with a single unducted propeller or a doublet of unducted, counter-rotating propellers, referred to as "open rotor". The invention can be applied to other fields where a speed reduction gear is required.

Figure 2:
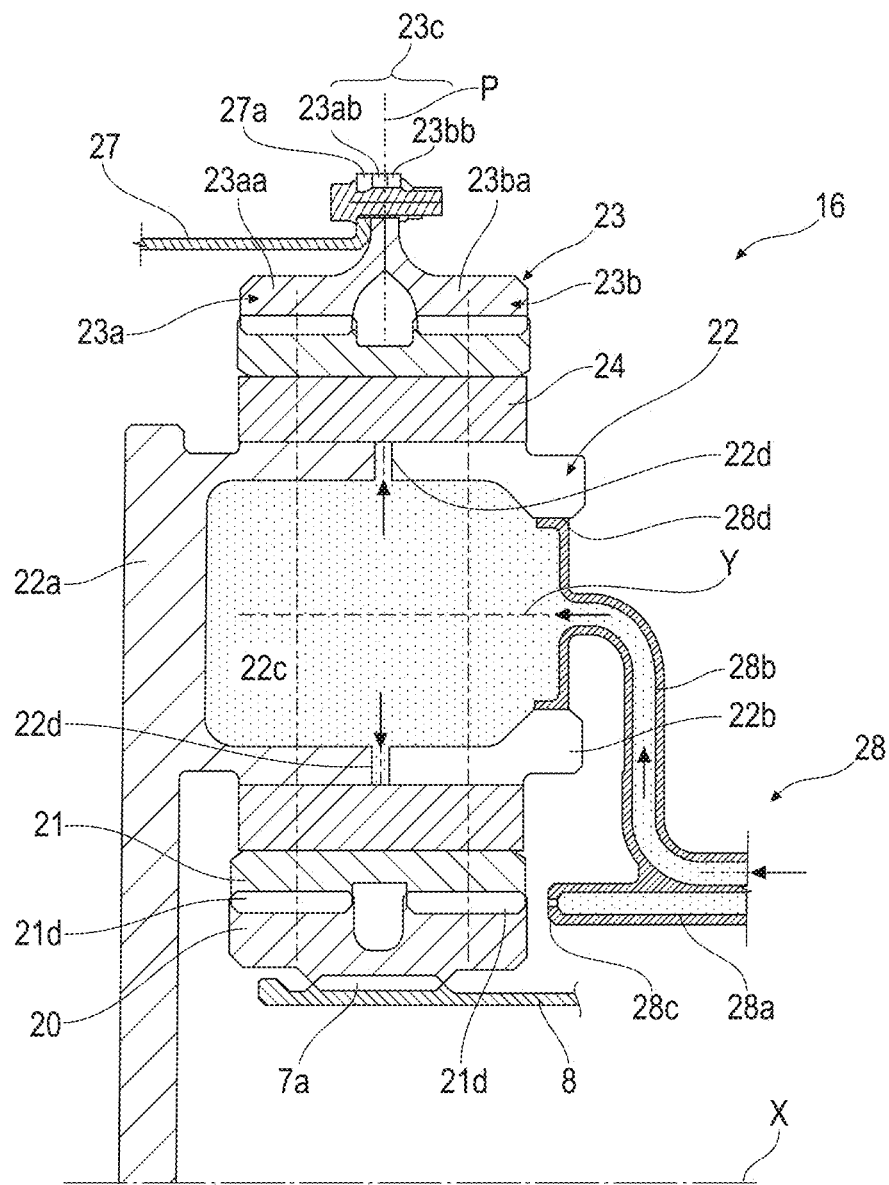
FIG. 2 is a partial axial sectional view of a speed reduction gear installed in a turbomachine according to the invention.

FIG. 2 describes a reduction gear 16 which can take the form of different architectures depending on whether certain parts are attached or in rotation.

At the entrance, the reduction gear 16 is connected to the low-pressure shaft 8, for example by means of splines 7*a*. The low-pressure shaft 8 drives a planetary pinion referred to as the sun gear 20. Classically, the sun gear 20, whose axis of rotation coincides with that of the longitudinal axis X of the turbomachine, drives a series of planet gear pinions referred to as planet gears 21, which are equally spaced on the same diameter around the longitudinal axis of rotation X. This diameter is equal to twice the operating centre distance between sun gear 20 and planet gears 21. The number of planet gears 21 is generally defined between three and seven for this type of application.

The assembly of the planet gears 21 is maintained by a chassis referred to as planet carrier 22. Each planet gear 21 rotates about its own axis Y and meshes with the external ring gear 23.

At the output we have:
  in an epicyclic configuration, the assembly of the planet gears 21 drives the planet carrier 22 in rotation around the axis X of the turbomachine. The ring gear 23 is attached to the engine casing or stator 6 via a ring gear carrier 27 and the planet carrier 22 is attached to the fan shaft 15.
  in a planetary configuration, the assembly of the planet gears 21 is maintained by a planet carrier 22 which is attached to the engine casing or stator 6. Each planet gear drives the ring gear which is fitted to the fan shaft 15 via a ring gear carrier 27. The external ring gear 23 is movable in rotation about the longitudinal axis X.

In this example, the speed reduction gear (or RGB) comprises a planetary gear train.

Each planet gear 21 is mounted free in rotation by means of a bearing 24, for example of the rolling or hydrodynamic bearing type. Generally speaking, a hydrodynamic bearing is supplied with "low" pressures (usually less than 10 bar). The rotation of the bearing allows the oil wedge to build up pressure and separate the planet gears and the bearings. Each bearing 24 (see FIG. 2) is mounted on one of the axes of the planet carrier 22 and all the axes are positioned relative to each other using one or more structural chassis 22*a* of the planet carrier 22. Each planet gear 21 meshes with external toothings of the sun gear 20 and internal toothings of the external ring gear 23. The internal toothings of the external ring gear 23 can be straight (parallel to the longitudinal axis), helical or chevron-shaped.

There is a number of axles and bearings equal to the number of planet gears. For reasons of operation, assembly, manufacture, inspection, repair or replacement, the axles and the chassis may be separated into several parts.

For the same reasons mentioned above, the toothing of a reduction gear 16 can be split into several propellers. In our example, we describe the operation of a reduction gear with several propellers with one ring gear divided into two half-ring gears:
  A front half-ring gear 23*a* consisting of a rim 23*aa* and an attachment half-flange 25*a*. The front propeller of the toothing of the reduction gear is located on the rim 23*aa*. This front propeller meshes with that of the planet gear 21 which meshes with that of the sun gear 20.
  A rear half-ring gear 23*b* consisting of a rim 23*ba* and an attachment half-flange 25*b*. The rear propeller of the toothing of the reduction gear is located on the rim 23*ba*. This rear propeller meshes with that of the planet gear 21 which meshes with that of the sun gear 20.

The attachment half-flange 25*a* of the front ring gear 23*a* and the attachment half-flange 25*b* of the rear ring gear 23*b* form the attachment flange 25 of the ring gear. The ring gear 23 is attached to a ring gear carrier by assembling the attachment flange 23*c* of the ring gear and the attachment flange 27*a* of the ring gear 27. The attachment is carried out here by means of attachment members. These attachment members can advantageously be bolted together, for example.

In this example of embodiment, the internal toothings of the external ring gear 23 can be herringbone-shaped with propellers that are separated along a median plane P. In this case, the first half-ring gear 23*a* comprises first propellers and the second half-ring gear 23*b* comprises second propellers. The first and second propellers of the internal toothings mesh with the external toothings of the planet gears 21, which mesh with those of the sun gear 20.

The arrows in FIG. 2 describe the conveying of the lubricant in the reduction gear 16. The lubricant enters the reduction gear 16 from the stator portion 6 into a dispenser 28 by various means which will not be specified in this view because they are specific to one or more types of architecture. The dispenser 28 is divided into two portions, each of which is generally repeated by the same number of planet gears. Injectors 28a lubricate the toothings and the arms 28b lubricate the bearings. The lubricant is fed to the injector 28a and exits from the end 28c so as to lubricate the toothings. The lubricant is also fed to the arm 28b and circulates via the supply mouth 28d of the bearing. The lubricant then circulates through the shaft in one or more buffer areas 22c and then exits through the orifices 22d so as to lubricate the bearings of the planet gears.

The term "radial" is defined in relation to a radial axis Z perpendicular to the longitudinal axis X.

The reduction gears can be composed of one or more meshing stages. This meshing is ensured in different ways such as by contact, friction or magnetic field. There are several types of contact meshing such as straight, helical or herringbone toothings.

In this application, the term "stage" refers to a first set of meshing teeth of a pinion that meshes with a second set of complementary teeth of another pinion. In the speed reduction gear, the number of stages refers in particular to the planet gears.

Figure 3:
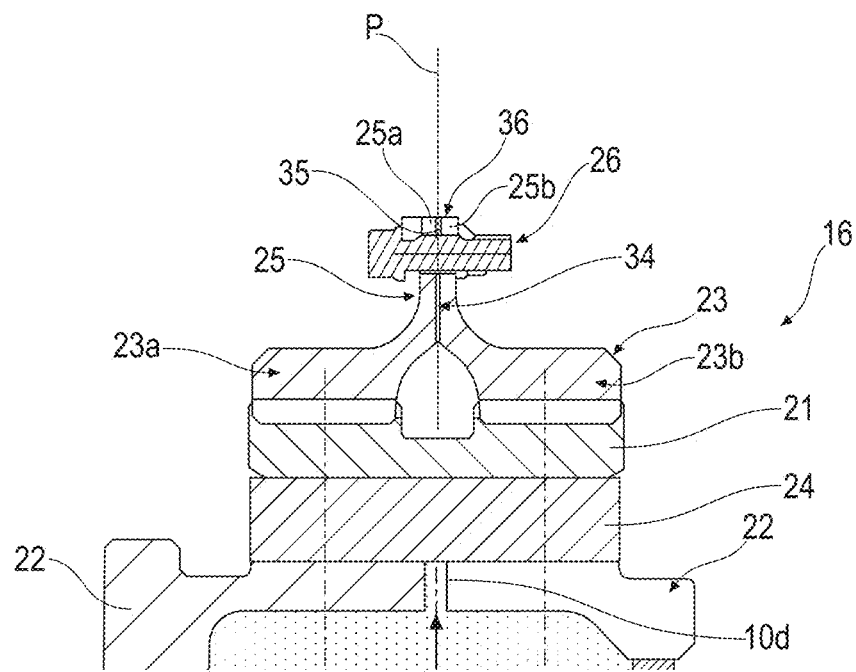
FIG. 3 is a detailed axial sectional view of FIG. 2.

Advantageously, but not restrictively, the speed reduction gear illustrated in FIGS. 2 and 3 is of the single-stage type (or simple-stage), providing a simple and compact architecture. This is the same toothing of a planet gear that cooperates with the sun gear 20 and the ring gear 23.

Figure 4:
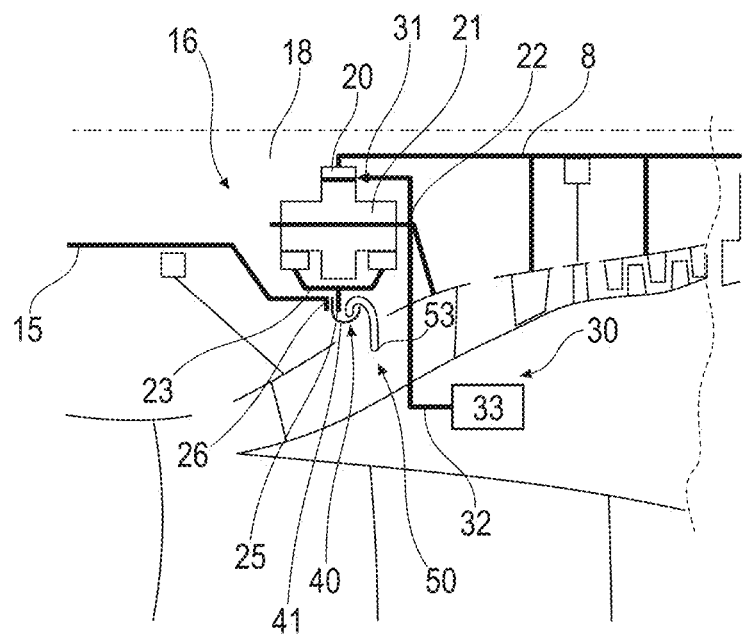
FIG. 4 is a partial axial sectional view of a member of a speed reduction gear according to the invention.

Alternatively, the speed reduction gear 16 can be of the two-stage type, as shown in FIG. 4. In particular, each planet gear is double-stage and comprises two separate toothings on different diameters. A first toothing on each planet gear cooperates with the sun gear 20 and a second toothing on each planet gear cooperates with the external ring gear 23. The first toothing, which meshes with the sun gear 20, has a first mean diameter and is located in a first median plane. The second toothing that meshes with the ring gear 23 has a second mean diameter and is located in a second median plane P. The median planes are parallel to each other and perpendicular to the axis X. The second diameter is smaller than the first diameter. Each first and second toothing may comprise a single propeller or may comprise two sets of herringbone teeth.

Advantageously, each planet gear pinion 21 comprises a cylindrical body and an annular web extending substantially radially outwards from the middle of this body. The second toothing is divided into two sets of herringbone teeth located respectively at the axial ends of the body. The first toothing comprises two series of herringbone-shaped teeth located at the external periphery of the web and separated from each other by an annular groove opening radially outwards with respect to the axis Y. The teeth of the toothings are arranged symmetrically with respect to the plane passing through the centre of the toothings.

This type of double-stage architecture allows to improve the reduction ratios while maintaining a small radial overall dimension and a reduced mass.

The meshing of the various internal and external toothings and the high forces applied within the gear of the speed reduction gear 16 require a significant lubrication and a cooling.

Referring to FIG. 4, the turbomachine 1 comprises a lubrication system 30 equipped with a dispenser 28 which injects the lubricant into the speed reduction gear 16. The turbomachine also comprises a lubricant circuit 32 connected, on the one hand, to the dispenser 28 and, on the other hand, to a supply reservoir 33. The lubricant passes through the various gears and is centrifuged radially outwards from the speed reduction gear 16.

With reference to FIG. 3, the external ring gear 23 advantageously comprises ejection means 34 by which the lubricant is ejected outside the speed reduction gear 16. The lubricant is also injected at the level of the rotary guide bearings for guiding the fan shaft 15.

The ejection means 34 comprise one or more channels 35, as shown in FIG. 3, which are for example evenly distributed at least around the circumference of the external ring gear 23. These channels 35 open onto the internal periphery of the external ring gear 23 on which the internal toothings (not shown) are defined. On the other hand, the channels 35 open onto the external periphery 36 of the attachment flange 25 of the external ring gear 23. The lubricant circulates from the inside of the external ring gear 23 to the outside via the channel or channels 35. The lubricant circulating around the circumference of the external ring gear 23 also evacuates between the fan shaft and the external ring gear.

Referring to FIG. 4, a recovery device 40 completes the assembly and is designed to recover and rapidly evacuate the lubricant ejected by centrifugal effect into the turbomachine and in particular into the enclosure 18. The recovery device 40 comprises a gutter 41 which is annular and centred on the longitudinal axis. The gutter 41 is arranged around the external ring gear 23.

Figure 5:
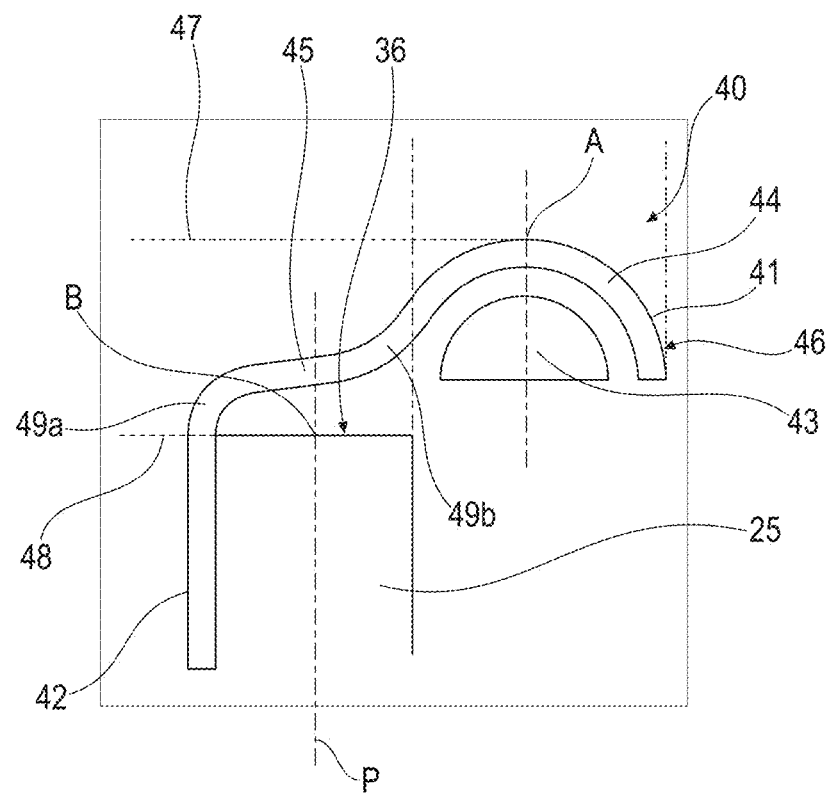
FIG. 5 shows a radial cross-sectional view of a first embodiment of a lubricant recovery device cooperating with a speed reduction gear according to the invention.

Referring to FIG. 5, the gutter 41 is secured in rotation to the external ring gear 23. To achieve this, the gutter 41 comprises a radial leg 42 which is attached to the radial attachment flange 25 of the external ring gear 23. The radial leg 42 is also annular. In the case of the external ring gear with two flanges, the radial leg 42 is attached to the first half-flange 25a. The radial leg 42 can also be attached to the radial shell of the fan shaft 15. The attachment is advantageous made with the same attachment members 26.

The gutter 41 also comprises a collection area 43 or recovery chamber into which a large quantity of lubricant is collected. The collection area 43 is delimited by a U-shaped, C-shaped or semi-circular (in an axial plane) retention wall 44. The retention wall 44 is also annular and centred on the longitudinal axis X. The retention wall 44 is connected to the radial leg 42. The collection area faces the external ring gear 23.

In the embodiment shown in FIG. 5, the gutter 41 comprises a guide wall 45 which connects the retention wall 44 to the radial leg 42. In other words, the guide wall 45 is located between the radial leg 42 and the retention wall 44. The guide wall 45 faces the external periphery 36 of the radial attachment flange 25. In particular, the guide wall 45 faces the lubricant ejection means 34.

The collection area 43 is axially offset with respect to the median plane P of the external ring gear 23, perpendicular to the longitudinal axis X. Here, the collection area 43 is located to the right of the radial attachment flange 25 of the external ring gear 23. Of course, the collection area 43 could be positioned opposite or to the left of the radial attachment flange 25. This configuration allows to reduce the radial overall dimension. By arranging the collection area 43 in an axially offset position, it is possible to take advantage of the axial space available in this portion of the enclosure 18.

The bottom of the retaining wall 44 lies radially outside the guide wall 45 and the external periphery 36 of the radial attachment flange 25. A first straight line 47 tangent to an external surface 46 of the gutter 41 passing through a point A located in a median plane of the retention wall 44 (in the plane of FIG. 5) is arranged at a predetermined distance from a second straight line 48 tangent to the external periphery 36 of the radial attachment flange 25. The second tangent line 48 passes through a point B located in the median plane P.

Advantageously, the wall of the gutter 41 has at least one inflection point. Even more specifically, the gutter 41 has an inflection point between the radial leg 42 and the guide wall 45. A first curved segment 49*a* comprising an inflection point is located between the radial leg 42 and the guide wall 45. This first curved segment 49*a* is concave with respect to the external ring gear 23. A second curved segment 49*b* comprising an inflection point is located between the guide wall 45 and the retention wall 44. The second curved segment 49*b* is convex facing the external ring gear 23. These curves allow the lubricant to circulate better on the internal surface of the various walls of the gutter 41 up to the collection area 43.

In order to prevent lubricant loss into the gutter 41, the guide wall is inclined relative to the longitudinal axis X. Advantageously, the guide wall 45 is not too inclined (angle less than 90°) nor too flat (angle greater than 0°) in relation to the longitudinal axis X. A steeply inclined guide wall 45 would not allow a maximum amount of lubricant to be conveyed to the collection area 43. A large angle of inclination would significantly distance the guide wall 45 from the ejection means 34 and the lubricant sprays would not be effectively redirected towards the collection area 43. For example, the angle of inclination of the direction of the guide wall 45 may be between 50° and 25° with respect to the longitudinal axis X. In this way, in the event of spraying, the lubricant can be received in the collection area 43 without loss.

Advantageously, the gutter 41 is made in a single piece. The gutter can be produced using an additive manufacturing method, conventional machining methods or by casting.

The gutter 41 is made of a metallic material or, advantageously, a metallic alloy.

Figure 6:
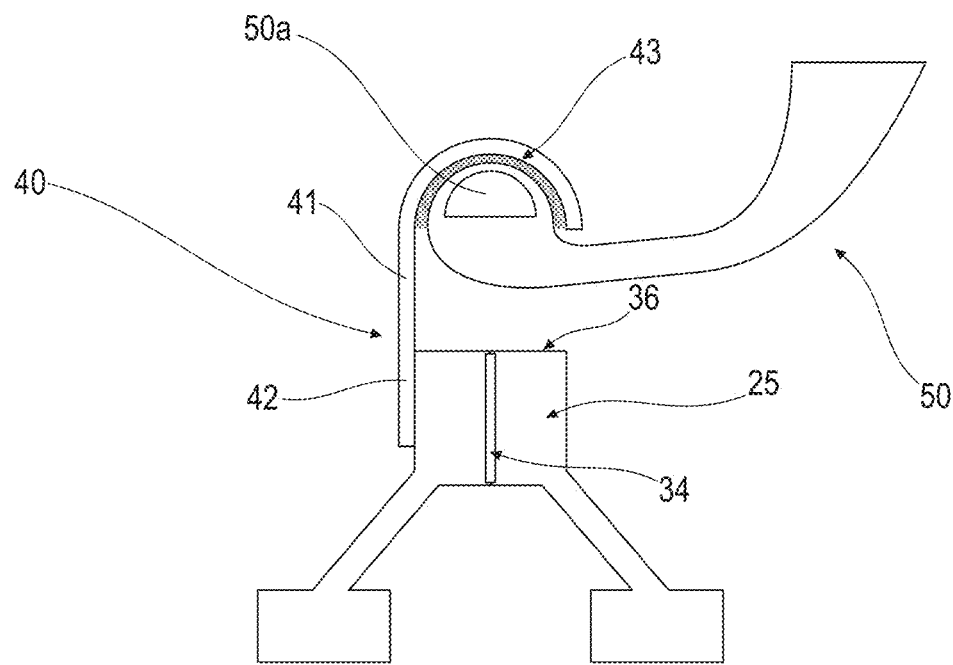
FIG. 6 shows a second embodiment of a lubricant recovery device cooperating with a speed reduction gear according to the invention.

With reference to FIG. 6, the assembly comprising the speed reduction gear also comprises a device 50 for evacuating the lubricant outside the gutter 41, which is arranged in the turbomachine. This evacuation device 50 is advantageously designed to prevent any lubricant from overflowing from the gutter 41. The evacuation device 50 extends at least partly into the collection area 43, i.e. into the gutter 41. The evacuation device 50 is configured so as to evacuate the lubricant located in the collection area 43 towards an oil evacuation area located outside the gutter. Advantageously, the evacuation device 50 is attached to the stator 6 of the turbomachine. In particular, the evacuation device 50 is attached to a casing of the turbomachine 1. Advantageously, the evacuation device 50 is separate from the speed reduction gear 16. The evacuation device 50 is secured to the casing of the turbomachine. We understand that such an arrangement allows the maximum amount of lubricant to be evacuated during the rotation of the gutter that collects the lubricant and to conserve the driving force of the lubricant, which is in permanent rotation in the gutter.

Advantageously, the evacuation device 50 comprises a first end arranged in the collection area 43 and a second end arranged outside the collection area 43.

Referring to FIGS. 4, 5, 6, 7 and 8, the evacuation device 50 comprises a pipe 51, at least a segment of which is installed in the gutter 41. More specifically, an inlet 52 of the pipe 51 is located or opens into the collection area 43. The inlet 52 of the pipe forms the first end of the evacuation device. The pipe 51 comprises an outlet 53 (see FIG. 4) which is connected to a recovery circuit in the turbomachine.

The outlet 53 of the pipe forms the second end of the evacuation device 50. In this example, the outlet 53 can be connected to the supply reservoir 33. In this way, the lubricant is collected by the inlet 52 and is channeled inside the pipe 51 to the outlet 53.

Alternatively, the outlet 53 is connected to a suction pump (not shown) of a recovery circuit. Alternatively, the outlet 53 is arranged freely in a storage reservoir at the bottom of the enclosure. In this case, the lubricant is sucked in with the remaining lubricant from the members of the front enclosure (fan bearings, etc.) by a single suction pump.

Figure 7:
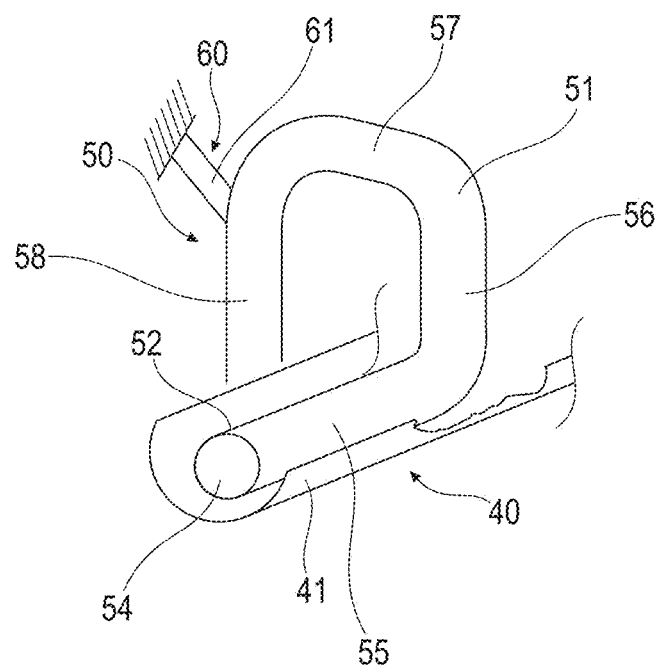
FIG. 7 is a schematic and perspective view of an embodiment of a device for evacuating a lubricant towards a lubricant supply reservoir, the evacuation device being installed at least in part in a lubricant recovery device according to the invention.
Figure 8:
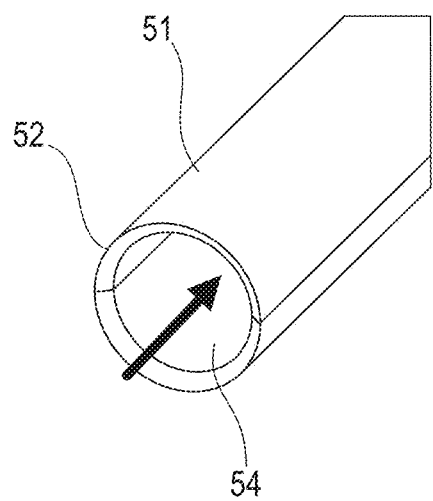
FIG. 8 shows a perspective view, in part and in detail, of a portion of the evacuation device shown in FIG. 7.

In the example shown in FIG. 7, the pipe 51 has a circular cross-section. Alternatively, the pipe 51 has a semi-circular, U-shaped or C-shaped cross-section. An opening 54 (at the level of the inlet 52) opens out inside the pipe 51.

FIG. 6 illustrates another embodiment for the gutter 41. The gutter 41 differs from the embodiment shown in FIG. 4 in that the collection area 43 is located opposite the radial attachment flange 25. There is no axial offset of the collection area 43. In this example, a large proportion of the lubricant ejected from the ejection means 34 at the level of the radial attachment flange 25 is received directly in the collection area 43. Some of the lubricant may circulate over the internal surface of the guide wall 45, which extends along the radial axis or substantially along the radial axis. The guide wall 45 can be inclined relative to the radial axis at an angle of inclination of between 3° and 10°.

An advantageous characteristic, as shown in FIG. 7, is that the pipe 51 comprises at least one inflection point to facilitate the arrangement relative to the gutter. Advantageously, the pipe comprises several curvatures to allow it to be arranged in relation to the rotating gutter 41 and to collect the lubricant easily. In particular, the pipe 51 comprises segments extending in different directions or dimensions from one another. More precisely still, the pipe 51 comprises a first segment 55 which extends in a tangential direction with respect to the internal surface of the gutter 41. This tangential direction is parallel to the circumferential direction of the gutter 41. The opening 54 in the pipe 51 at the level of the inlet 52 faces the lubricant flow. In this way, the lubricant can enter the pipe 51 easily and directly. This comprises a second segment 56 which extends generally (parallel or at an angle of, for example, 5°) in the radial direction so that the lubricant can be extracted from the gutter 41. The pipe 51 comprises a third segment 57 which extends generally (parallel or at an angle of, for example, 5°) in a direction parallel to the longitudinal axis so as to offset the pipe axially from the gutter 41. This configuration also allows the gutter 41 to rotate relative to the stationary pipe 51. Finally, the pipe 51 comprises a fourth segment 58 which is connected to the supply reservoir 33. These first, second, third and fourth segments 55, 56, 57, 58 are connected by curved segments. In general, the changes of direction in the various segments are gradual (with no sharp edges).

FIG. 6 also shows that the portion of the evacuation device 50 that extends into the gutter 41 is curved and has a half-moon shape. The latter forms a hollow 50*a*.

Advantageously, the different segments of the pipe 51 are spaced apart by a certain distance to avoid the contact with the walls of the gutter and allow the gutter to rotate without obstacles.

With the pipe 51, the lubricant is scooped at a given point and the pipe is wide enough to avoid pressure losses. With this configuration, it will be possible to recover and evacuate the desired flow rate to convey it to the recovery point at 6 o'clock. If necessary, the lubricant can be evacuated towards the reservoir 33.

An advantageous characteristic, as shown in FIG. 7, is that at least one stiffening element 60 is provided to oppose resonance developments in the movement of the rotating gutter 41 during operation of the turbomachine. The stiffening element 60 comprises an arm 61 which extends between the body of the pipe 51 and a stator casing of the turbomachine.

Figure 9:
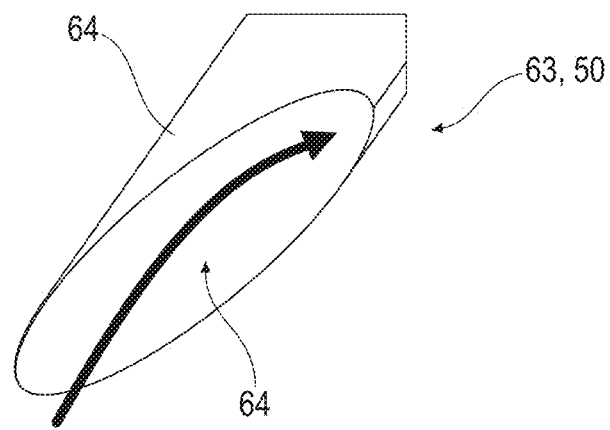
FIG. 9 shows another embodiment of a portion of the lubricant evacuation device according to the invention.

FIG. 9 shows a further embodiment of the evacuation device 50. In this embodiment, the evacuation device 50 comprises an end which is arranged in the collection area and which is bevelled so as to evacuate the lubricant located in the collection area 43 towards a lubricant evacuation area located outside the gutter 41. In this embodiment, the device 50 comprises a deflector 63. The deflector 63 is configured to deflect the lubricant towards a predetermined location outside the gutter 41 and out of the collection area 43. The deflector 63 comprises a first segment 64 arranged in the collection area 43. The first segment 64 forms the first end of the evacuation device 50. The deflector 63 also comprises a second segment (not shown) which is arranged outside the collection area 43. The second segment forms the second end of the evacuation device. The second segment is directed towards a specific point in the lubrication enclosure 18. Several deflectors 63 can be arranged in the collection area of the gutter 41.

To this end, the deflector 63 advantageously has a deflecting surface 65 configured so as to evacuate the lubricant located in the collection area 43 towards a lubricant evacuation area located outside the gutter 41. Advantageously, the surface 65 is flat so that the lubricant can slide and/or circulate towards the outside of the gutter 41. The flat surface 65 is supported by the first segment 64. In this case, the lubricant is sprayed at the precise point in the lubrication enclosure 18 so that the evacuation is controlled. According to another example of embodiment, the surface 65 of the deflector 63 is concave or convex depending on the lubricant collection strategies in the enclosure of the speed reduction gear (and the shapes of the enclosure).

In the present application, the lubricant is oil.

The evacuation device 50 is easy to implement and takes up very little space in the enclosure. The device 20 allows the lubricant to be evacuated from the gutter so as to prevent the gutter 41 from overflowing anywhere in the enclosure.

The invention claimed is:

1. A turbomachine assembly extending about a longitudinal axis (X) and comprising:
    a speed reduction gear comprising a sun gear pinion, planet gear pinions, and an external ring gear, the planet gear pinions being in mesh on one hand with the sun gear pinion and on another hand with the external ring gear, and
    a recovering gutter for recovering a lubricant ejected by centrifugal effect from the speed reduction gear during operation, the gutter being arranged around the external ring gear and comprising an area for collecting the lubricant received by ejection,
    wherein the gutter is secured in rotation to the external ring gear, and wherein the turbomachine assembly comprises an evacuation device for evacuating the lubricant towards an outside of the collection area, the evacuation device being connected to a stator of the turbomachine assembly and extending at least partly into the collection area of the gutter, the evacuation device being configured to evacuate the lubricant situated in the collection area towards a lubricant evacuation area situated outside the gutter.

2. The turbomachine assembly according to claim 1, wherein the external ring gear is movable in rotation about the longitudinal axis (X).

3. The turbomachine assembly according to claim 1, wherein each planet gear pinion comprises the same toothing meshing with the sun gear pinion and the external ring gear.

4. The turbomachine assembly according to claim 1, wherein each planet gear pinion comprises a first toothing of a first mean diameter meshing with the sun gear pinion and a second toothing of a second mean diameter, different from the first mean diameter, meshing with the external ring gear.

5. The turbomachine assembly according to claim 1, wherein the external ring gear comprises a radial attachment flange to which a radial leg of the gutter is attached, the radial attachment flange comprising means for ejecting the lubricant outside the speed reduction gear.

6. The turbomachine assembly according to claim 5, wherein the external ring gear is formed by two half-ring gears, which respectively comprise a first half-flange and a second half-flange, the first half-flange and the second half-flange forming the radial attachment flange and being attached against each other by attachment members.

7. The turbomachine assembly according to claim 5, wherein the collection area of the gutter is axially offset from the radial attachment flange with respect to a median plane (P) of the external ring gear perpendicular to the longitudinal axis (X).

8. The turbomachine assembly according to claim 5, wherein the collection area of the gutter is delimited by a retention wall having a U-shaped, C-shaped, or semi-circular axial cross-section, the retention wall being connected to the radial leg via a guide wall, which is inclined with respect to the longitudinal axis (X).

9. The turbomachine assembly according to claim 8, wherein the guide wall of the gutter has an inflection point at a junction with the retention wall.

10. The turbomachine assembly according to claim 5, wherein the collection area of the gutter faces the radial attachment flange.

11. The turbomachine assembly according to claim 1, wherein the evacuation device comprises a first end arranged in the collection area and a second end arranged outside the collection area.

12. The turbomachine assembly according to claim 1, wherein the evacuation device comprises at least one pipe comprising a plurality of segments extending in different directions from one another, the at least one pipe comprising an inlet which opens into the collection area of the gutter to evacuate the lubricant located in the collection area towards a lubricant evacuation area located outside the gutter.

13. The turbomachine assembly according to claim 1, wherein the evacuation device comprises at least one deflector, a first segment of which is arranged in the collection area of the gutter, the first segment having a deflecting surface configured to evacuate the lubricant located in the collection area towards a lubricant evacuation area located outside the gutter.

14. The turbomachine assembly according to claim 1, wherein the evacuation device comprises an end arranged in the collection area, the end is beveled to evacuate the lubricant located in the collection area towards a lubricant evacuation area located outside the gutter.

15. A turbomachine comprising the turbomachine assembly according to claim 1.

* * * * *